(12) United States Patent
Verret

(10) Patent No.: US 9,275,267 B2
(45) Date of Patent: Mar. 1, 2016

(54) SYSTEM AND METHOD FOR AUTOMATIC REGISTRATION OF 3D DATA WITH ELECTRO-OPTICAL IMAGERY VIA PHOTOGRAMMETRIC BUNDLE ADJUSTMENT

(71) Applicant: Raytheon Company, Waltham, MA (US)

(72) Inventor: Jody D. Verret, Rockwall, TX (US)

(73) Assignee: Raytheon Company, Waltham, MA (US)

( * ) Notice: Subject to any disclaimer, the term of this patent is extended or adjusted under 35 U.S.C. 154(b) by 317 days.

(21) Appl. No.: 14/053,990

(22) Filed: Oct. 15, 2013

(65) Prior Publication Data
US 2014/0112579 A1     Apr. 24, 2014

Related U.S. Application Data

(60) Provisional application No. 61/717,407, filed on Oct. 23, 2012.

(51) Int. Cl.
*G06K 9/00* (2006.01)

(52) U.S. Cl.
CPC .......... *G06K 9/00201* (2013.01); *G06K 9/0063* (2013.01)

(58) Field of Classification Search
USPC ......................................... 382/154, 162, 294
See application file for complete search history.

(56) References Cited

U.S. PATENT DOCUMENTS

| | | | | |
|---|---|---|---|---|
| 6,097,836 A * | 8/2000 | Inoue | G06T 5/009 | 358/518 |
| 8,503,761 B2 * | 8/2013 | Akbari | G06K 9/00637 | 382/154 |
| 8,761,506 B1 * | 6/2014 | Padwick | G06K 9/0063 | 382/167 |
| 2009/0271054 A1 * | 10/2009 | Dokken | G01S 13/9307 | 701/21 |
| 2010/0208981 A1 * | 8/2010 | Minear | G06T 11/001 | 382/154 |
| 2011/0110580 A1 * | 5/2011 | Akbari | G06K 9/00637 | 382/154 |
| 2014/0112536 A1 * | 4/2014 | Ely | G06T 15/506 | 382/103 |
| 2015/0269438 A1 * | 9/2015 | Samarasekera | G06K 9/00637 | 382/154 |

OTHER PUBLICATIONS

"Airborne1—LiDAR and Oblique Home Page", [online}. [archived on Feb. 22, 2012]. Retrieved from the Internet: <URL: https://web.archive.org/web/20120222220314/http://www.airborne1.com/>, (2012), 1 pg.

(Continued)

*Primary Examiner* — Ishrat I Sherali
(74) *Attorney, Agent, or Firm* — Schwegman Lundberg & Woessner, P.A.

(57) ABSTRACT

Accurate automatic registration and fusion of LADAR (from laser detection and ranging) and EO (electro-optical) data from different sensors provides additional analysis and exploitation value beyond what each data set provides on its own. Such data sets often exhibit significant misregistration due to uncorrelated geometric errors between or among two or more sensors. One or more automatic algorithms achieve superior registration as well as algorithms for fusing the data in three dimensions (3D). The fused data can provide multi-image colorization for change detection, automatic generation of surface relief colorization, interactive and/or automatic filtering of 3D vegetation points for LADAR foliage penetration analysis, automatic surface orientation determination for improved spectroradiometric exploitation, and other benefits that cannot be achieved by the LADAR or EO data alone.

20 Claims, 7 Drawing Sheets

(56) References Cited

OTHER PUBLICATIONS

"GeoEye® Elevating Insight, Internent Home Page", [online]. © 2012 GeoEye, Inc. [archived on Feb. 9, 2012]. Retrieved from the Internet: <URL: https://web.archive.org/web/20120209083833/http://www.geoeye.com/CorpSite/>, (2012), 2 pgs.

Knowlton, Robert, "Airborne Ladar Imaging Research Testbed", Tech Notes, Lincoln Laboratory, Massachusetts Institute of Technology, (2011), 2 pgs.

* cited by examiner

SYSTEM AND METHOD FOR AUTOMATIC REGISTRATION OF 3D DATA WITH ELECTRO-OPTICAL IMAGERY VIA PHOTOGRAMMETRIC BUNDLE ADJUSTMENT

CROSS-REFERENCE TO RELATED APPLICATIONS

This application claims the benefit of U.S. Provisional Application No. 61/717,407, filed Oct. 23, 2012, titled "System And Method For High Accuracy Automatic Registration Of 3D Data With Electro-Optical Imagery Via Photogrammetric Bundle Adjustment".

TECHNICAL FIELD

Examples pertain to automatic registration of three-dimensional data. Some examples relate to automatic target recognition.

BACKGROUND

Commercial earth observation satellites, such as Ikonos and Geoeye-1, offer imagery of ground-based targets. These satellites typically offer multispectral (MSI) imaging, which provides images at red, green, blue, and near-infrared wavelengths, and panchromatic (PAN) imaging, which provides black-and-white images formed from wavelengths that span the visible spectrum. This imagery is commonly referred to as electro-optical (EO) imagery.

In many cases, the multispectral images show registration errors with respect to one another and with respect to 3D sources such as LADAR. For instance, shadows that appear on the ground and green leaves from a tree may erroneously spill onto a roof of an adjacent building, or white vent covers on a non-white roof may not be aligned with their proper three-dimensional locations. These are but two specific examples; other registration errors are possible. These registration errors may complicate use of the multispectral images, and can introduce uncertainty in downstream applications that rely on the multispectral images to locate particular objects.

Laser Detection and Ranging (LADAR), typically obtained from aircraft that fly over the ground-based targets, can produce a three-dimensional profile of the targets. LADAR can produce a collection of points that represent the surface or surfaces of the targets, which is often referred to as a point cloud. However, because typical LADAR uses only one eye-safe wavelength, typical LADAR does not return color data from the target. In addition, LADAR 3D data is often misregistered with respect to the MSI images, due largely to uncorrelated geometric support data errors between the two sources. Manual registration of LADAR and 3D data is time consuming, and thus seldom performed accurately.

SUMMARY

Literal and non-literal exploitation of electro-optical (EO) imagery alone is often limited by operator estimates of local 3D geometry. Fusion of LADAR and EO data provides a rich 3D data set in which spectroradiometric information from the EO data can be combined with 3D information from the LADAR data for enhanced exploitation and analysis.

Multispectral images (e.g., electro-optical or EO imagery), obtained from a satellite and exhibiting registration errors, are combined with three-dimensional data (e.g., a point cloud formed as a collection of 3D geodetic coordinates, such as those obtained from LADAR) to produce color images having reduced registration errors. In some examples, an algorithm produces or obtains a panchromatic-sharpened MSI image; obtains ground control points (GCPs) in the 3D geodetic coordinates; inputs the 3D geodetic coordinates and corresponding image coordinates into a photogrammetric bundle adjustment (BA); colorizes the 3D geodetic coordinates with the registered EO data to generate and store red, green, and blue values for each 3D geodetic coordinate; and displays the red, green, and blue values as colorized values for each 3D geodetic coordinate, e.g., each point in the point cloud.

This summary is intended to provide an overview of subject matter of the present patent application. It is not intended to provide an exclusive or exhaustive explanation of the invention. The Detailed Description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
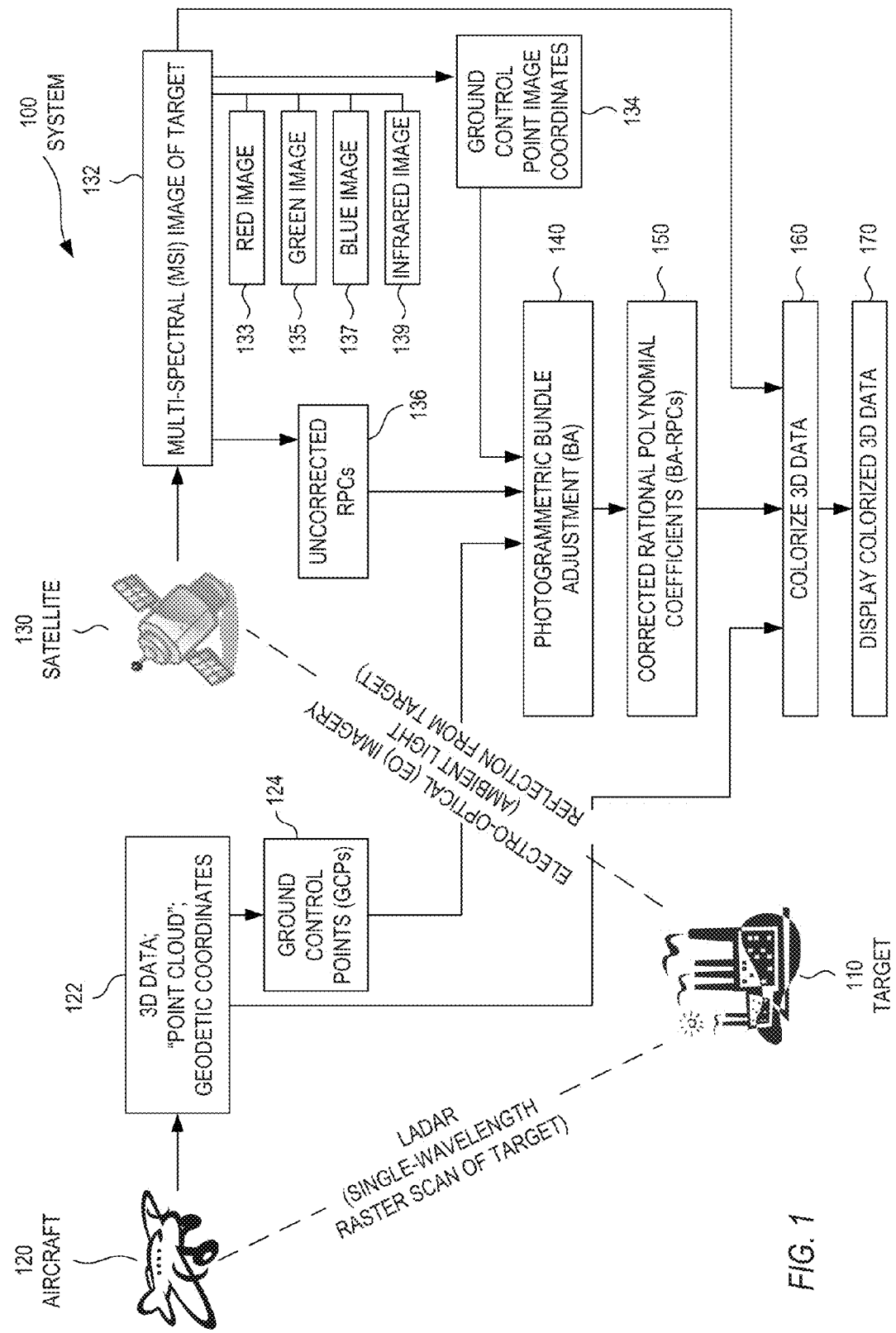
FIG. 1 is a schematic drawing of a system that automatically registers 3D data with a multispectral image in accordance with some embodiments.

FIG. 1 is a schematic drawing of a system 100 that automatically registers 3D data with a multispectral image in accordance with some embodiments.

The system 100 provides images of a target 110. Suitable targets 110 can include a building, a campus of buildings, a military facility, and others. The target 110 is often in an inhospitable environment, and is usually inaccessible from the ground. As a result, the target 110 may be observable only from above, as viewed from an aircraft or a satellite. The target 110 is not part of the system 100.

An aircraft 120 can fly over the target 110, and can use Laser Detection And Ranging (LADAR) to observe the target 110. In LADAR, the aircraft 120 sends a laser pulse downward, toward the target 110, receives light reflected from the target 110, and formulates a distance to the target based on a time-of-flight of the laser pulse. LADAR scans the laser pulses from side-to-side while flying over the target 110, thereby obtaining data from the target 110 in two lateral dimensions. LADAR returns values of height (Z) of the target 110 as a function of lateral location (X,Y) on the target 110. The collection of (X,Y,Z) points returned from a LADAR scan is referred to as 3D data 122, or, equivalently, a point cloud, or a collection of geodetic coordinates. The 3D data produced by LADAR is considered to be highly accurate. In addition, LADAR can return values of reflected intensity as a function of lateral location (X,Y), for the wavelength at which the target 110 is scanned. Typically, LADAR uses an eye-safe wavelength in the infrared. LADAR does not return color information from the target 110, and cannot produce a color image of the target 110. The aircraft 120 and LADAR system are not part of the system 100; the 3D data 122 is an input to the system 100.

A satellite 130 can also fly over the target 110, and can use electro-optical (EO) imagery to observe the target 110. EO imagery relies on ambient light reflected from the target 110, and does not use explicit illumination. The ambient light reflected from the target 110 is collected by a camera on the satellite 130. The camera separates the collected light by wavelength bands, and directs light in each wavelength band onto its own detector. EO imagery returns a multi-spectral image (MSI) 132 of the target 110, which can include data representing a red image 133, a green image 135, a blue image 137, and an infrared image 139. EO imagery does return color information from the target 110, but often suffers from misregistration due in part to errors in spacecraft location and pointing. This misregistration may cause a particular feature to appear shifted from one image to another or from an absolute ground location of the feature (e.g. in a LADAR data set). The satellite and EO imaging system are not part of the system 100; the multi-spectral image 132 is an input to the system 100. The multi-spectral image 132 can also be provided from airborne EO sensors.

The system 100 uses the 3D data 122 and the multi-spectral image 132 as inputs. The system 100 extracts ground control points (GCPs) 124, 134 from the 3D data 122 and the multi-spectral image 132, respectively. The system 100 inputs the GCPs 124, 134, as well as uncorrected RPCs 136, into a photogrammetric bundle adjustment (BA) 140 and produces a set of corrected rational polynomial coefficients (BA-RPCs) 150. The system 100 uses the BA-RPCs 150 and MSI image 132 to colorize the 3D data 122 at 160. The system displays the colorized 3D data at 170.

The system 100 can be a computer system that includes hardware, firmware and software. Examples may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some examples, computer systems can include one or more processors, optionally connected to a network, and may be configured with instructions stored on a computer-readable storage device.

Figure 2:
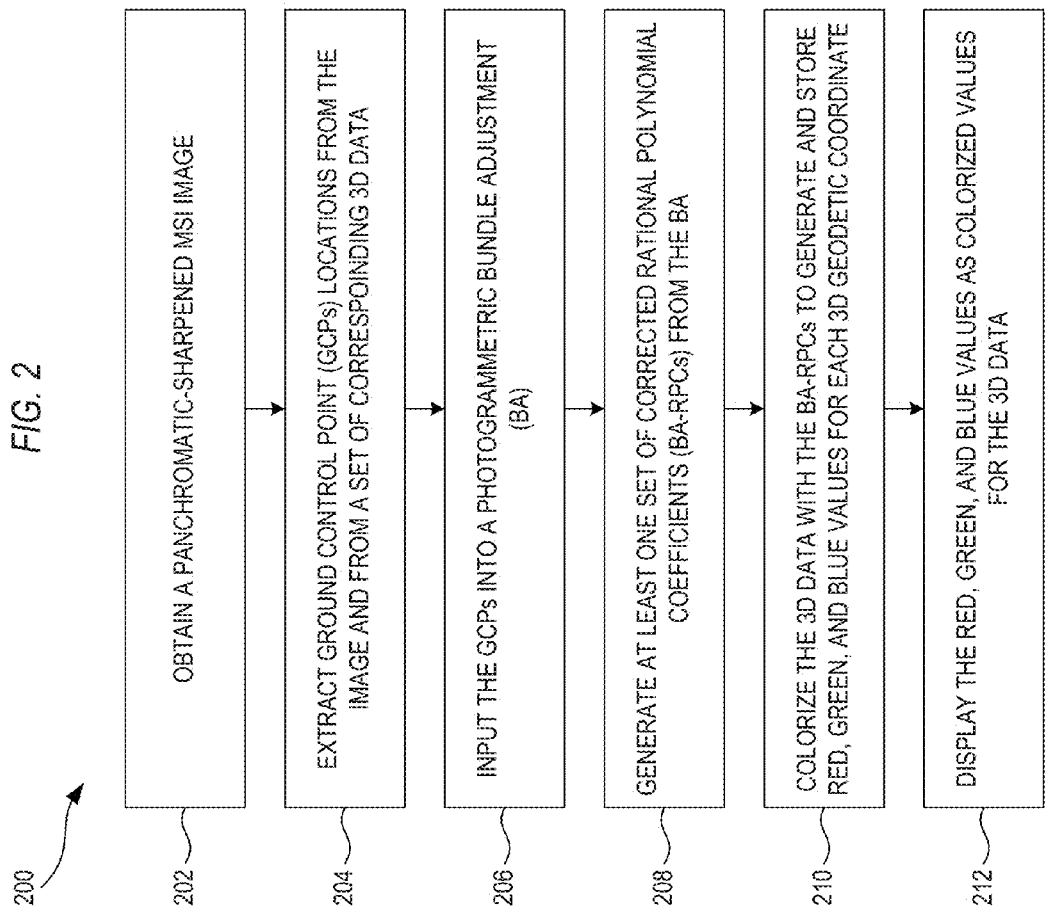
FIG. 2 is a flow chart of an example of a method of automatically registering 3D data with a multispectral image.

FIG. 2 is a flow chart of an example of a method 200 of automatically registering 3D data with a multispectral image, which can be executed by the system 100 of FIG. 1 or by other suitable systems. Step 202 obtains a panchromatic-sharpened multispectral (MSI) image. The MSI can be obtained from a commercial earth observation satellite, or can be produced internally. Step 204 extracts ground control points coordinates (GCPs) from the image and from a set of corresponding 3D data. The set of 3D data can be a point cloud formed as a collection of 3D geodetic coordinates, such as those obtained from LADAR. Alternatively, the 3D data can be derived from other sources, such as terrain data. Historically, GCPs are accurately surveyed ground locations whose image coordinates are manually picked from the EO image by a human; the algorithms and method described herein automate obtaining the GCPs from the 3D data. Step 206 inputs the ground control points into a photogrammetric bundle adjustment (BA). Autocorrelated tie point coordinates from multiple, separate MSI images can also be input into the BA. Step 208 outputs at least one set of corrected rational polynomial coefficients from the photogrammetric bundle adjustment, one set per MSI image. Step 210 colorizes the 3D data with the corrected rational polynomial coefficients to generate and store red, green, and blue values for each 3D geodetic coordinate. Step 212 displays the red, green, and blue values as colorized values for the 3D data. The method 200 can be repeated as needed to incorporate data from one or more images.

The output from the method 200 can be a static display, such as a color image of a particular target, a static video display, such as a series of color images of a particular target as seen from a single fly-over path, a dynamic single-frame display, such as a color image of a particular target as seen from a controllable orientation, or a dynamic video-frame display, such as a series of color images of a particular target as seen from a controllable fly-over path. There are many known user interfaces that allow for dynamic control of the target orientation or of viewer orientation, such as those used for CAD programs.

Figure 3:
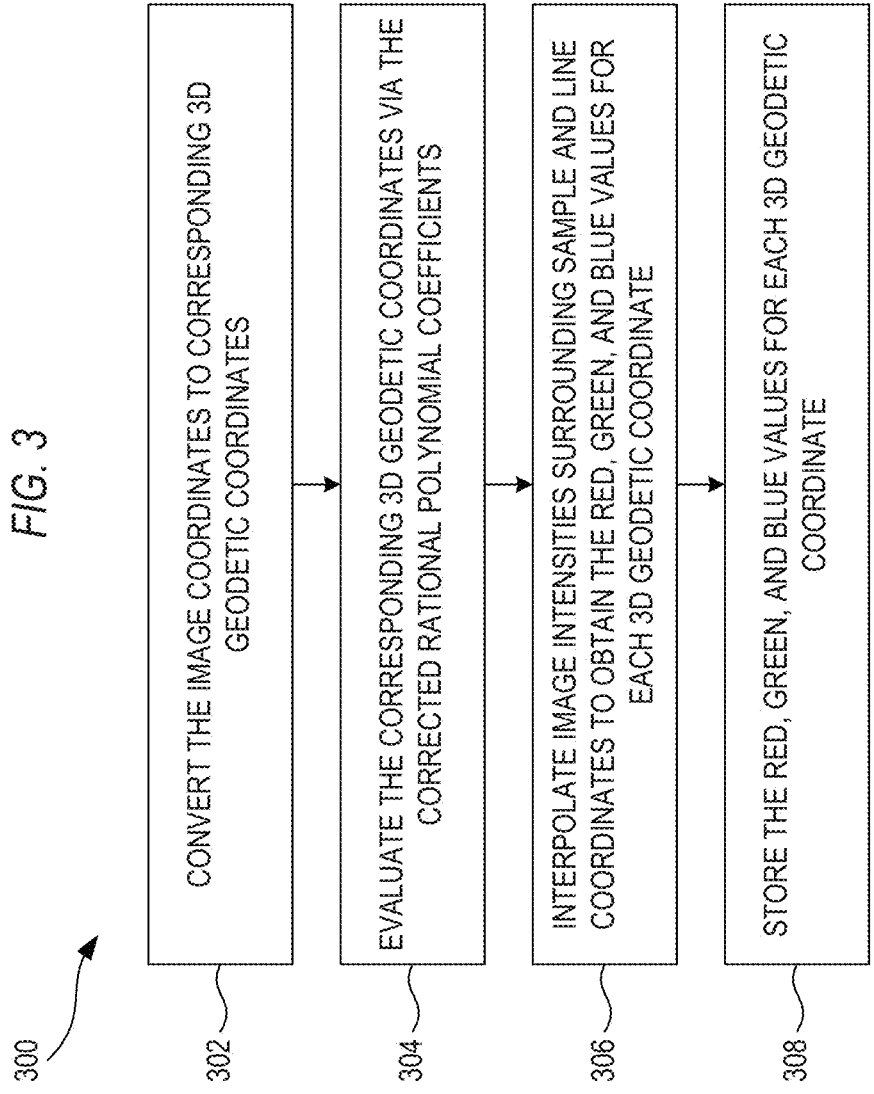
FIG. 3 is a flow chart of an example of a method of colorizing 3D data with BA-RPCs to generate and store red, green, and blue values for each 3D geodetic coordinate.

FIG. 3 is a flow chart of an example of a method 300 of colorizing 3D data with BA-RPCs to generate and store red, green, and blue values for each 3D geodetic coordinate, such as in step 210 of FIG. 2. Step 302 converts the image coordinates to corresponding 3D geodetic coordinates for identification of occluding 3D data. In some examples, Universal Transverse Mercator (UTM) coordinates, typically in (XYZ), are converted to geodetic coordinates. In some examples, the conversion includes vertical datum conversion to World Geodetic System 1984 (WGS84) height above ellipsoid (HAE). Step 304 evaluates the corresponding 3D geodetic coordinates via the corrected rational polynomial coefficients. Evaluation of the BA-RPCs can produce floating-point sample and line coordinates in the EO image(s). Step 306 interpolates image intensities surrounding sample and line coordinates to obtain the red, green, and blue values for each 3D geodetic coordinate. Step 308 stores the red, green, and blue values for each 3D geodetic coordinate. In some examples, the red, green, and blue values are stored as extra fields for each 3D geodetic coordinate, or LADAR point. FIG. 3 shows one example for colorizing 3D data with BA-RPCs to generate and store red, green, and blue values for each 3D geodetic coordinate; other suitable methods may also be used.

Figure 4:
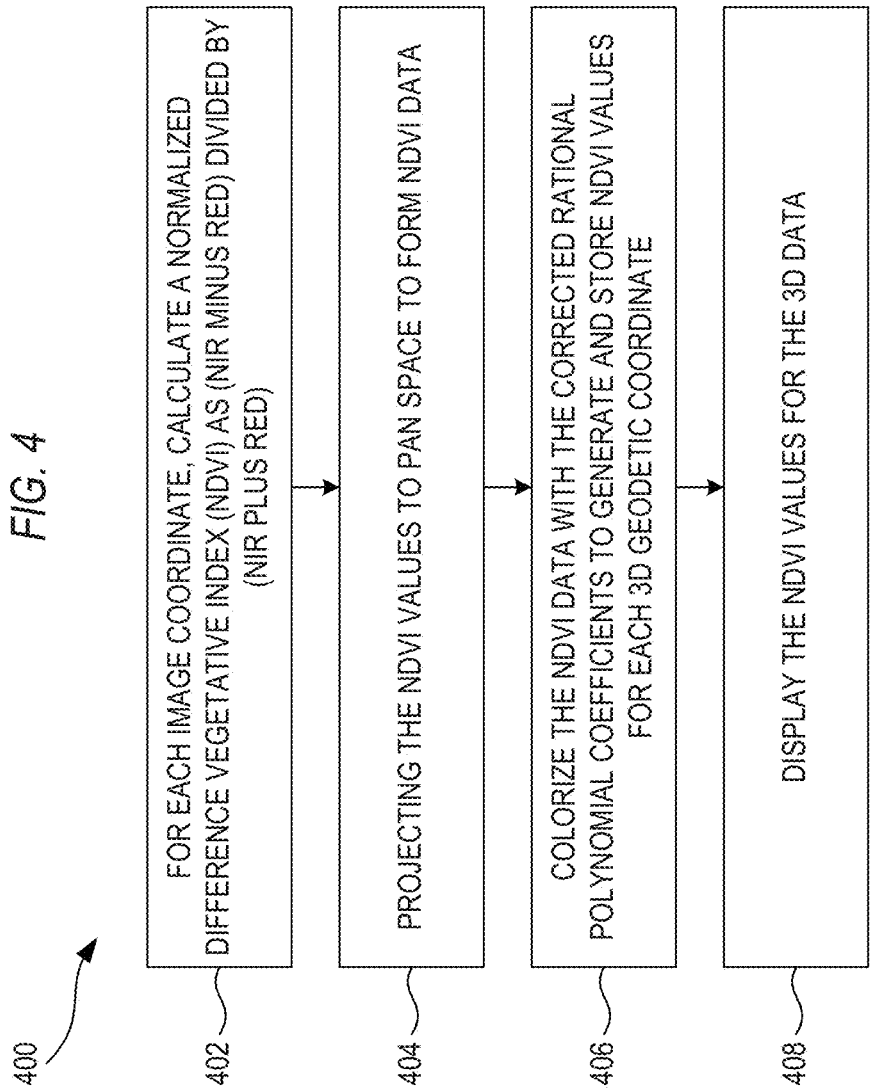
FIG. 4 is a flow chart of an example of a method of augmenting the colorization with additional data.

FIG. 4 is a flow chart of an example of a method 400 of augmenting the colorization with additional data. In this example, a Vegetative Index is calculated; other quantities may also be used. Step 402, for each image coordinate, calculates a Normalized Difference Vegetative Index (NDVI) as (NIR minus RED) divided by (NIR plus RED), where NIR is an intensity value from a near-infrared image in the multispectral image, and RED is an intensity value from a red image in the multispectral image. Alternatively, the NDVI, or other suitable quantity, may be calculated by another suitable formula. Step 404 projects the NDVI values to PAN space to form NDVI data. Step 406 colorizes the NDVI data with the corrected rational polynomial coefficients to generate and store NDVI values for each 3D geodetic coordinate. Step 408 displays the NDVI values for the 3D data. For a LADAR point cloud colorized with NDVI, areas with vegetation appear with a relatively high intensity, while non-vegetative areas appear with a relatively low intensity. FIG. 4 shows one example for augmenting the colorization with additional data; other suitable methods may also be used.

In some examples, the system can use colorization to show changes from one image to another. The images can be generated at different times. For instance, if a car has moved from one location to another, the system can use a particular color to indicate the different locations of the car in the images.

Figure 5:
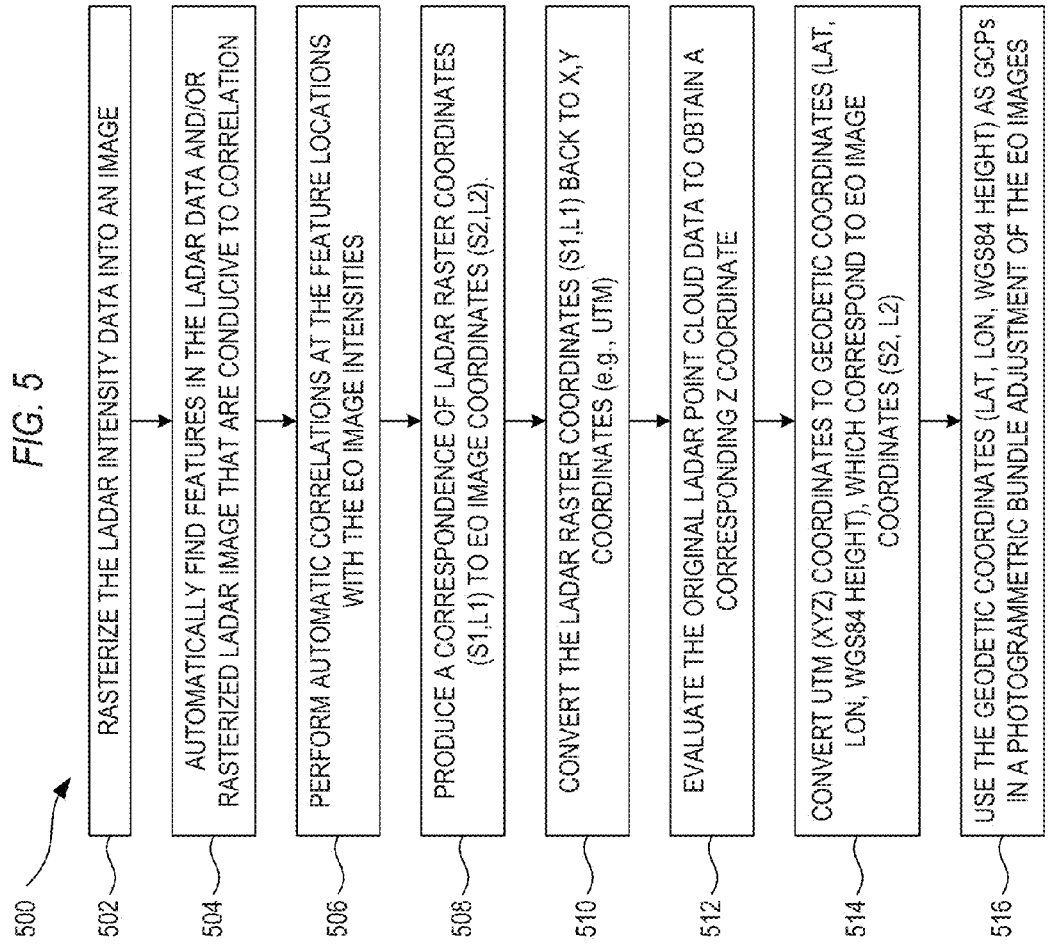
FIG. 5 is a flow chart of an example of a method of automatically extracting the ground control points from a set of 3D data.

FIG. 5 is a flow chart of an example of a method 500 of automatically extracting the ground control points (124 and 134 in FIG. 1) from a set of 3D data and image data (122 and 132 in FIG. 1), as in step 204 of FIG. 2. Historically, extracting GCPs has been done manually. Method 500 provides a fully automated approach. Step 502 rasterizes the LADAR intensity data into an image. Step 504 automatically finds features in the LADAR data and/or rasterized LADAR image that are conducive to correlation. There exist several known algorithms that perform this step. Step 506 performs automatic correlations at the feature locations with the EO image intensities. The correlations produce a correspondence of LADAR raster coordinates (s1,l1) to EO image coordinates (s2,l2) at step 508. Step 510 converts the LADAR raster coordinates (s1,l1) back to X,Y coordinates (e.g., UTM). Step 512 evaluates the original LADAR point cloud data to obtain a corresponding Z coordinate. Step 514 converts UTM (XYZ) coordinates to geodetic coordinates (lat, lon, WGS84 height), which correspond to an EO image coordinate (s2, l2). Step 516 uses the automatically-determined ground coordinates as GCPs in a photogrammetric bundle adjustment of the EO image(s). FIG. 5 shows one example for automatically extracting the ground control points from a set of 3D data; other suitable methods may also be used.

There may be instances when the intensity data, as used in step 502 of FIG. 5, is excessively noisy. An alternate approach uses a map of surface shaded relief (SSR). SSR is similar to terrain shaded relief (TSR), but also includes man-made features, such as buildings.

Figure 6:
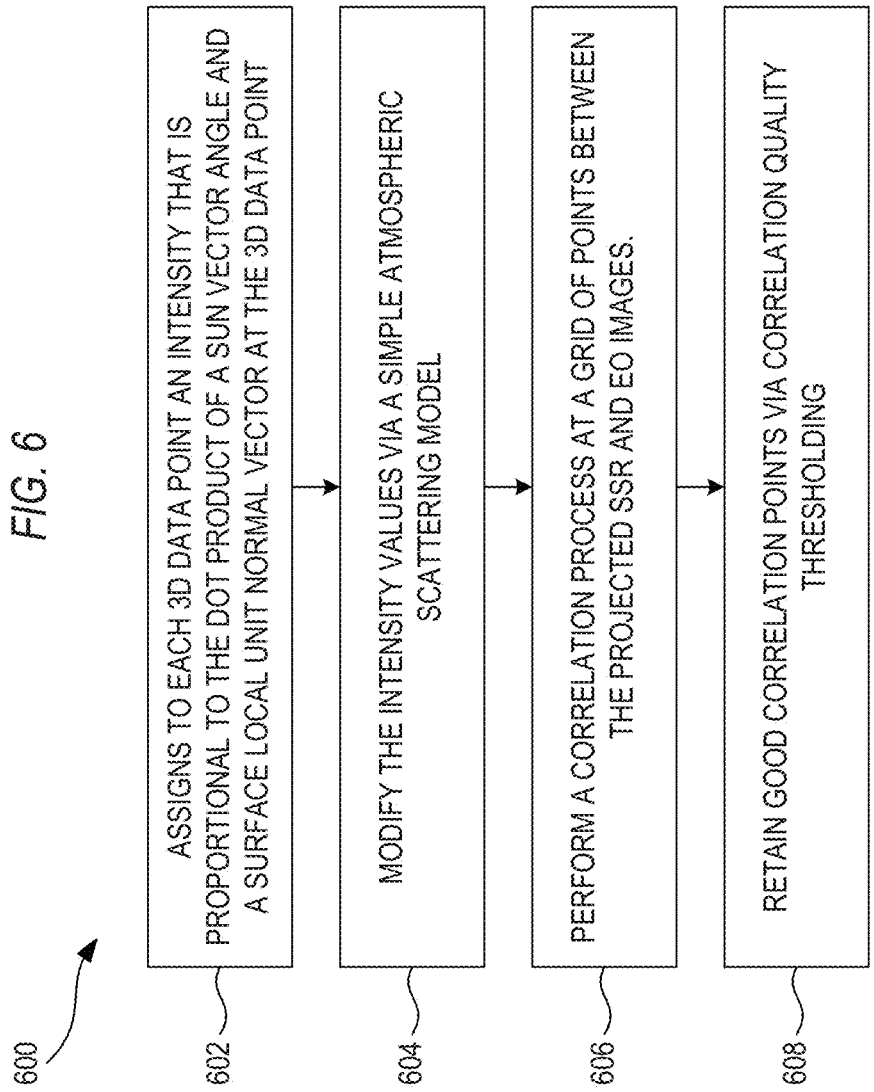
FIG. 6 is a flow chart of an example of a basic method of automatically extracting the ground control points from a set of 3D data, using SSR instead of the intensity data provided by LADAR.

FIG. 6 is a flow chart of an example of a basic method 600 of automatically extracting the ground control points (124 and 134 in FIG. 1) from a set of 3D data and image data (122 and 132 in FIG. 1), using SSR instead of the intensity data provided by LADAR. Step 602 assigns to each 3D data point (122 in FIG. 1) an intensity that is proportional to the dot product of a sun vector angle and a surface local unit normal vector at the respective 3D data point. Locations that experience sun occlusions, such as shadows, are included with this process as well. Step 604 modifies the intensity values via a simple atmospheric scattering model. The intensity of shadows is not identically equal to zero, so that ambient or reflective lighting conditions can reveal detail within the shadows. Step 606 performs a correlation process at a grid of points between the projected SSR and EO images. Step 608 retains good correlation points via correlation quality thresholding. FIG. 6 shows one example for automatically extracting the ground control points from a set of 3D data; other suitable methods may also be used.

Figure 7:
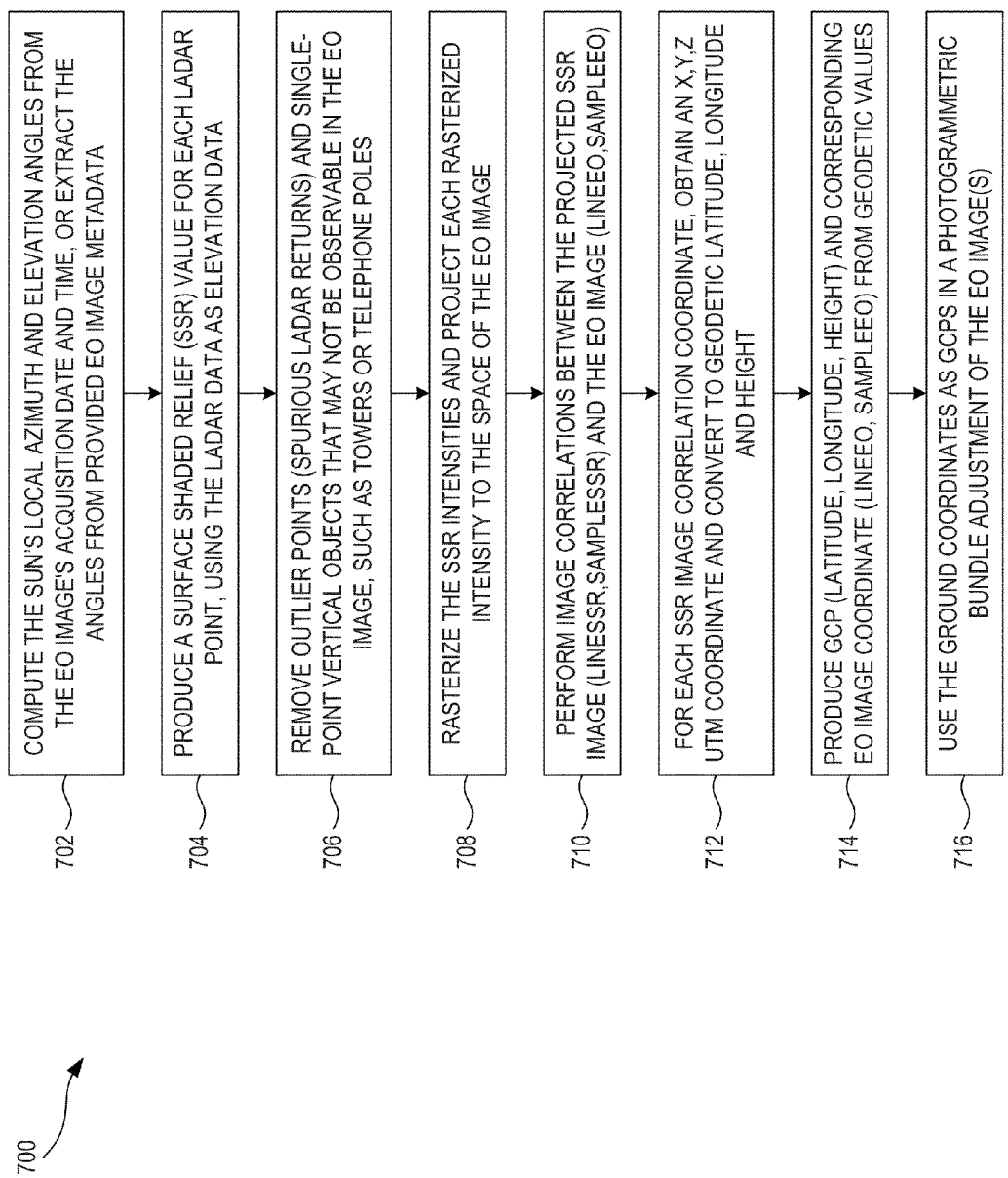
FIG. 7 fleshes out the basic method of FIG. 6 in a more detailed method of automatically extracting the ground control points from a set of 3D data, using SSR instead of the intensity data provided by LADAR.

FIG. 7 fleshes out the basic method 600 of FIG. 6 in a more detailed method 700 of automatically extracting the ground control points (124 in FIG. 1) from a set of 3D data (122 in FIG. 1), using SSR instead of the intensity data provided by LADAR. Step 702 compute the sun's local azimuth and elevation angles from the EO image's acquisition date and time, or extracts the angles from provided EO image metadata. Step 704 produces a surface shaded relief (SSR) value for each LADAR point, using the LADAR data as elevation data. Step 706 removes outlier points (spurious LADAR returns) and single-point vertical objects that may not be observable in the EO image, such as towers and telephone poles. Step 706 may be performed at various times in this method, including along with other steps. Step 708 rasterizes the SSR intensities and projects each rasterized intensity to the space of the EO image. The resulting projected SSR looks very similar to the original EO image, with regard to shadow edge content. Step 710 performs image correlations between the projected SSR image (lineSSR, sampleSSR) and the EO image (lineEO, sampleEO). There are several known edge-based and/or pixel-intensity based correlation approaches that can be used for step 710. Step 712 obtain an X,Y,Z UTM coordinate and converts it to geodetic latitude, longitude and height, for each SSR image correlation coordinate. Step 714 produces GCP (latitude, longitude, height) and corresponding EO image coordinate (lineEO, sampleEO) from geodetic latitude, longitude and height. Step 716 uses the ground coordinates as GCPs in a photogrammetric bundle adjustment of the EO image(s).

For the method of FIG. 7, the correlation process results in conjugate locations in the projected SSR image and the PAN image. The projected SSR image coordinates are then mapped to conjugate X, Y, Z locations in the LADAR cloud. The UTM X,Y,Z coordinates are converted to geodetic longitude, latitude and height via inverse UTM map projection. The results of the above are many automatically-generated GCPs in the form of quintuplets: (longitude, latitude, height, PAN_sample, PAN_line). These are input to the bundle adjustment (BA), which solves for error models in the geometry of the PAN image.

One particularly interesting outcome of generating the SSR for auto-GCPs is that the SSR intensity output at every LADAR data point can be a useful product in and of itself. Even in the absence of complementary EO imagery, SSR can provide an additional useful visual context of the underlying terrain and associated ground features, further complementing the usual color-mapped height presented in standard LADAR viewers.

The system 100 (of FIG. 1) can include robust outlier rejection. The bundle adjustment is a simultaneous geometric solution utilizing all of the GCPs. If any of the GCP image residuals exceed a statistical tolerance, the observation can be removed from the adjustment. This can reduce the number of false positive auto-GCP correlations, which could otherwise produce erroneous conjugates.

The system 100 (of FIG. 1) can include occlusion processing for LADAR colorization. In some cases, the system can evaluated each point cloud location and project through the BA-RPCs to obtain image coordinates. As a byproduct of this ground-to-image approach, points on the ground (e.g., under trees) not visible to a satellite camera can be colorized with the associated observed pixel intensities (e.g. trees). A better approach for dealing with occlusions is to project from the original satellite image coordinates down to the point cloud (as in step 302 of FIG. 3). In this way, the image-to-ground line-of-sight (LOS) vector can be used in conjunction with the point cloud data for occlusion processing. If the LOS vector intersects a point on a building before a point on the ground, the ground point is not colorized.

The system 100 (of FIG. 1) can include occlusion processing for point cloud data filtering based on vector element thresholding. If the occlusion processing works appropriately, elements of the multi-image LADAR vector can be thresholded for filtering of the 3D point cloud data. For example, NDVI intensities can be used as a thresholding mechanism for removal of foliage for more robust foliage penetration (FOPEN) processing of the LADAR data. The removal of foliage points can be achieved via an interactive tool in which the points below specific NDVI values are removed. Alternatively, the same process can be achieved via an automatic algorithm.

The system 100 (of FIG. 1) can include use of LADAR data in target orientation estimation. Since the underlying LADAR data is 3D, the local orientation of strategic targets can easily be estimated. The orientation of a target surface can be important for spectroradiometric exploitation algorithms that rely on accurate measurements of the Bidirectional Reflectance Distribution Function (BRDF). One such algorithm is material identification of a target in a scene via multispectral EO image radiometry. With EO imagery alone, target orientation is often assumed to be horizontal, or else estimated by a human. With fused LADAR and EO, the target orientation can be accurately estimated automatically, via the 3D XYZ coordinates of the LADAR data. Then, the corresponding target reflectance can be computed from the radiometric EO data and the estimated target tilt.

What is claimed is:

1. A system for automatically registering 3D data with a multispectral image, the system comprising processing circuitry arranged to:
    obtain a panchromatic-sharpened multispectral image having image coordinates;
    extract ground control point coordinates (GCPs) from the image and from a set of corresponding 3D data, the 3D data including a plurality of 3D geodetic coordinates;
    input the ground control points into a photogrammetric bundle adjustment (BA);
    generate at least one set of corrected rational polynomial coefficients from the photogrammetric bundle adjustment; and
    colorize the 3D data with the corrected rational polynomial coefficients to generate and store red, green, and blue values for each 3D geodetic coordinate.

2. The system of claim 1, wherein the processing circuitry is further arranged to display the red, green, and blue values as colorized values for the 3D data.

3. The system of claim 1, wherein colorizing the 3D geodetic coordinates comprises:
    converting the image coordinates to corresponding 3D geodetic coordinates for occlusion determination;
    evaluating the corresponding 3D geodetic coordinates via the corrected rational polynomial coefficients;
    interpolating image intensities surrounding sample and line coordinates to obtain the red, green, and blue values for each 3D geodetic coordinate; and
    storing the red, green, and blue values for each 3D geodetic coordinate.

4. The system of claim 3, wherein the red, green, and blue values are stored as extra fields for each 3D geodetic coordinate.

5. The system of claim 3, wherein the processing circuitry is further arranged to:
    for each image coordinate, calculate a Normalized Difference Vegetative Index (NDVI) as (NIR minus RED) divided by (NIR plus RED), where NIR is an intensity value from a near-infrared image in the multispectral image, and RED is an intensity value from a red image in the multispectral image;
    projecting the NDVI values to PAN space to form NDVI data;
    colorizing the NDVI data with the corrected rational polynomial coefficients to generate and store NDVI values for each 3D geodetic coordinate; and
    displaying the NDVI values for the 3D data.

6. The system of claim 1, wherein the panchromatic-sharpened multispectral image is produced by a satellite.

7. The system of claim 1, wherein the at least one set of 3D geodetic coordinates is obtained from laser detection and ranging (LADAR).

8. The system of claim 1, wherein extracting ground control points (GCPs) from the image coordinates and from the set of corresponding 3D data comprises:
    rasterizing the LADAR intensity data into an image;
    automatically finding features in the LADAR intensity data that are conducive to correlation;
    performing automatic correlations at the feature locations with the EO image intensities;
    producing a correspondence of LADAR raster coordinates to EO image coordinates;
    converting the LADAR raster coordinates to X,Y coordinates;
    evaluating the 3D data to obtain a corresponding Z coordinate;
    converting UTM coordinates to geodetic coordinates, which correspond to EO image coordinates (s2, l2);
    using the automatically-determined ground coordinates as GCPs in a photogrammetric bundle adjustment of the EO image(s).

9. The system of claim 1, wherein extracting ground control points (GCPs) from the image coordinates and from the set of corresponding 3D data comprises:
    assigning to each 3D data point an intensity that is proportional to the dot product of a sun vector angle and a surface local unit normal vector at the 3D data point;
    modifying the intensity values via a simple atmospheric scattering model;
    performing a correlation process at a grid of points between projected SSR and EO images; and
    retaining good correlation points via correlation quality thresholding.

10. A method for automatically registering 3D data with a multispectral image, the method comprising:
    obtaining a panchromatic-sharpened multispectral image having image coordinates;
    extracting ground control points (GCPs) from the image coordinates and from a set of corresponding 3D data, the 3D data including a plurality of 3D geodetic coordinates;
    inputting the ground control points into a photogrammetric bundle adjustment (BA);
    generating at least one set of corrected rational polynomial coefficients from the photogrammetric bundle adjustment; and
    colorizing the 3D data with the corrected rational polynomial coefficients to generate and store red, green, and blue values for each 3D geodetic coordinate.

11. The method of claim 10, further comprising displaying the red, green, and blue values as colorized values for the 3D data.

12. The method of claim 10, wherein colorizing the 3D geodetic coordinates comprises:
    converting the image coordinates to corresponding 3D geodetic coordinates;
    evaluating the corresponding 3D geodetic coordinates via the corrected rational polynomial coefficients;

interpolating image intensities surrounding sample and line coordinates to obtain the red, green, and blue values for each 3D geodetic coordinate; and storing the red, green, and blue values for each 3D geodetic coordinate.

13. The method of claim 12, wherein the red, green, and blue values are stored as extra fields for each 3D geodetic coordinate.

14. The method of claim 12, further comprising:

for each image coordinate, calculate a Normalized Difference Vegetative Index (NDVI) as (NIR minus RED) divided by (NIR plus RED), where NIR is an intensity value from a near-infrared image in the multispectral image, and RED is an intensity value from a red image in the multispectral image;

projecting the NDVI values to PAN space to form NDVI data;

colorizing the NDVI data with the corrected rational polynomial coefficients to generate and store NDVI values for each 3D geodetic coordinate; and displaying the NDVI values for the 3D data.

15. The method of claim 12, wherein the panchromatic-sharpened multispectral image is produced by a satellite.

16. The method of claim 10, wherein the at least one set of 3D geodetic coordinates is obtained from laser detection and ranging (LADAR).

17. The method of claim 10, wherein extracting ground control points (GCPs) from the image coordinates and from the set of corresponding 3D data comprises:

rasterizing the LADAR intensity data into an image;

automatically finding features in the LADAR intensity data that are conducive to correlation;

performing automatic correlations at the feature locations with the EO image intensities;

producing a correspondence of LADAR raster coordinates to EO image coordinates;

converting the LADAR raster coordinates to X,Y coordinates;

evaluating the 3D data to obtain a corresponding Z coordinate;

converting UTM coordinates to geodetic coordinates, which correspond to EO image coordinates (s2, l2);

using the automatically-determined ground coordinates as GCPs in a photogrammetric bundle adjustment of the EO image(s).

18. The method of claim 10, wherein extracting ground control points (GCPs) from the image coordinates and from the set of corresponding 3D data comprises:

assigning to each 3D data point an intensity that is proportional to the dot product of a sun vector angle and a surface local unit normal vector at the 3D data point;

modifying the intensity values via a simple atmospheric scattering model;

performing a correlation process at a grid of points between projected SSR and EO images; and retaining good correlation points via correlation quality thresholding.

19. A non-transitory computer-readable storage medium that stores instructions for execution by one or more processors to perform operations for automatically registering 3D data with a multispectral image, the operations comprising:

obtaining a panchromatic-sharpened multispectral image having image coordinates;

automatically extracting ground control points (GCPs) from the image coordinates and from a set of corresponding 3D data, the 3D data including a plurality of 3D geodetic coordinates;

inputting the ground control points into a photogrammetric bundle adjustment (BA);

generating at least one set of corrected rational polynomial coefficients from the photogrammetric bundle adjustment; and colorizing the 3D data with the corrected rational polynomial coefficients to generate and store red, green, and blue values for each 3D geodetic coordinate.

20. The non-transitory computer-readable storage medium of claim 19, wherein the operations further comprise displaying the red, green, and blue values as colorized values for the 3D data.

* * * * *